(No Model.)

6 Sheets—Sheet 1.

H. C. STILWELL.
CASH REGISTER AND INDICATOR.

No. 462,105.

Patented Oct. 27, 1891.

WITNESSES
W. S. Hugette
H. E. Whitaker

INVENTOR
Henry C. Stilwell
by R. Mason
Attorney.

(No Model.) 6 Sheets—Sheet 2.
H. C. STILWELL.
CASH REGISTER AND INDICATOR.

No. 462,105. Patented Oct. 27, 1891.

WITNESSES
INVENTOR
Henry C Stilwell
by
R. Mason
Attorney.

(No Model.)　　　　　　　H. C. STILWELL.　　　　6 Sheets—Sheet 3.
CASH REGISTER AND INDICATOR.

No. 462,105.　　　　　　　　　　　Patented Oct. 27, 1891.

WITNESSES
W. S. Huyette
H. E. Whitaker

INVENTOR
Henry C. Stilwell
by
R. Mason
Attorney.

(No Model.) H. C. STILWELL. 6 Sheets—Sheet 4.
CASH REGISTER AND INDICATOR.
No. 462,105. Patented Oct. 27, 1891.
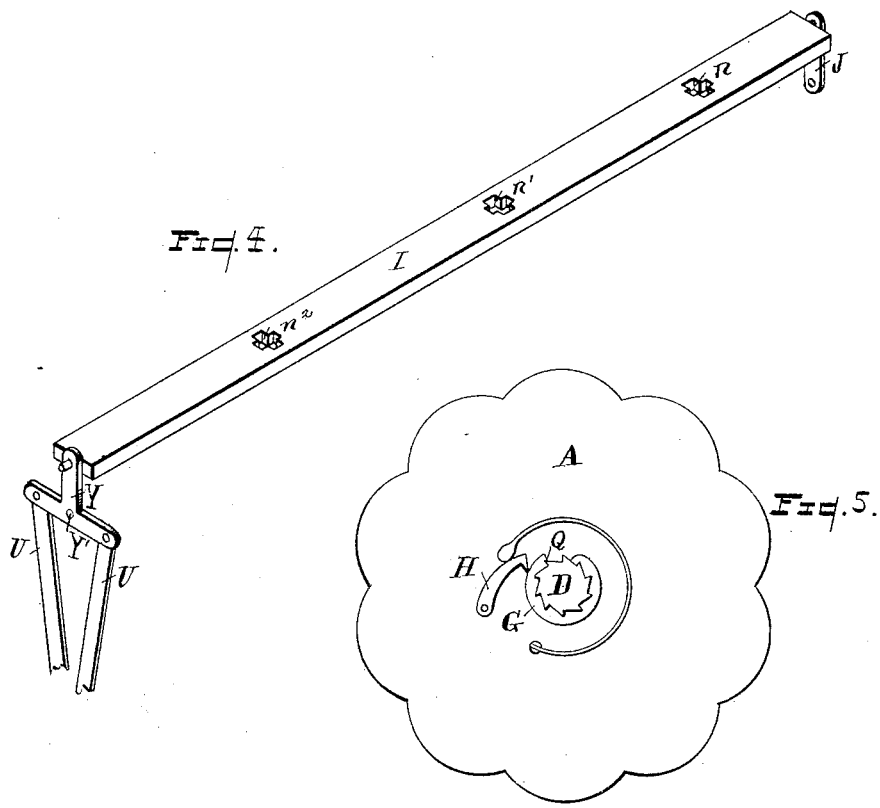
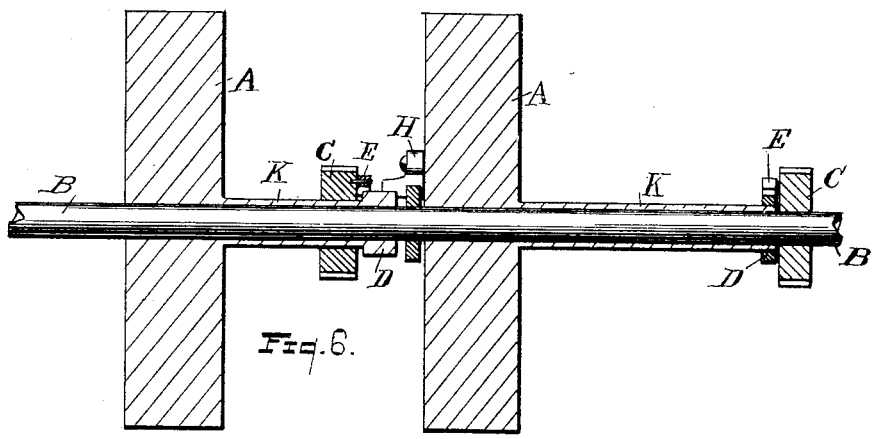
WITNESSES
INVENTOR
Henry C. Stilwell
by
R. Mason
Attorney.

(No Model.) 6 Sheets—Sheet 5.

H. C. STILWELL.
CASH REGISTER AND INDICATOR.

No. 462,105. Patented Oct. 27, 1891.

WITNESSES
W. S. Huyette
H. E. Whitaker

INVENTOR
Henry C. Stilwell
by R. Mason
Attorney.

(No Model.) 6 Sheets—Sheet 6.
H. C. STILWELL.
CASH REGISTER AND INDICATOR.
No. 462,105. Patented Oct. 27, 1891.
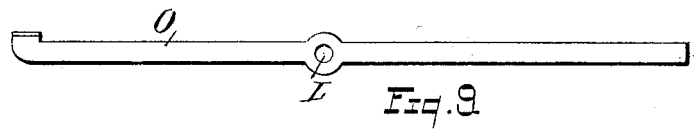
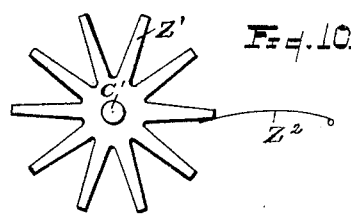
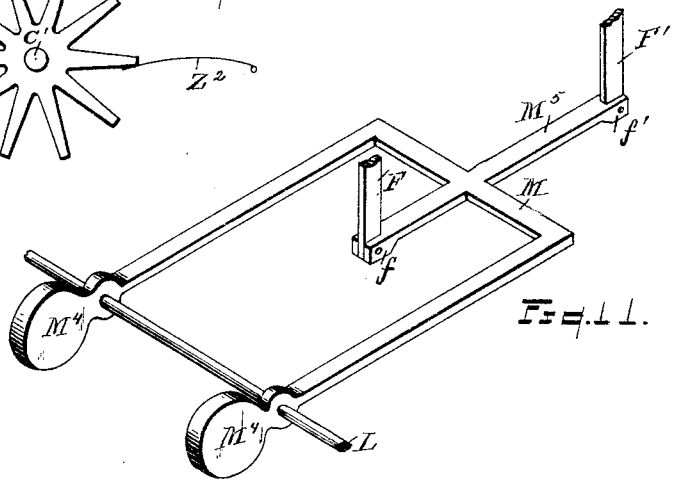
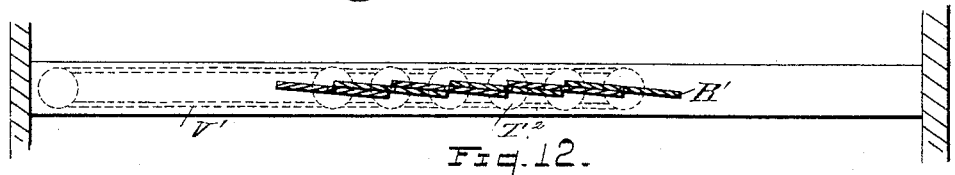
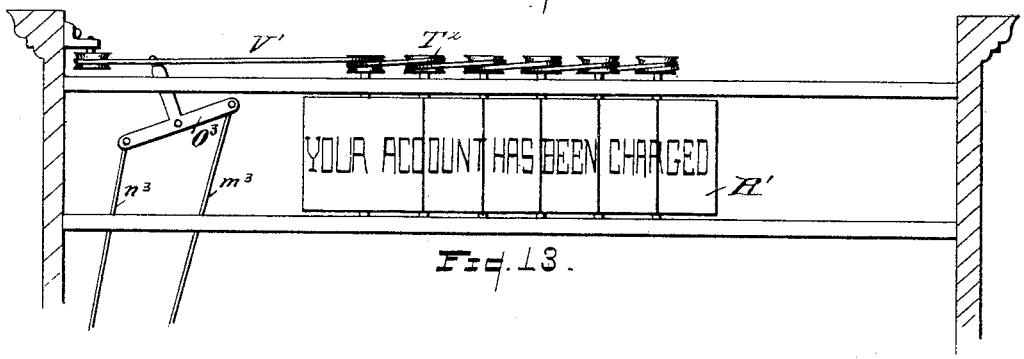
WITNESSES
INVENTOR

UNITED STATES PATENT OFFICE.

HENRY C. STILWELL, OF DAYTON, OHIO.

CASH REGISTER AND INDICATOR.

SPECIFICATION forming part of Letters Patent No. 462,105, dated October 27, 1891.

Application filed April 27, 1889. Renewed April 23, 1891. Serial No. 390,090. (No model.)

*To all whom it may concern:*

Be it known that I, HENRY C. STILWELL, of Dayton, Ohio, have invented new and useful Improvements in Cash Registers and Indicators, of which the following is a specification.

My invention relates particularly to that class of machines in which provision is made for independently registering cash and credit sales.

Figure 1:
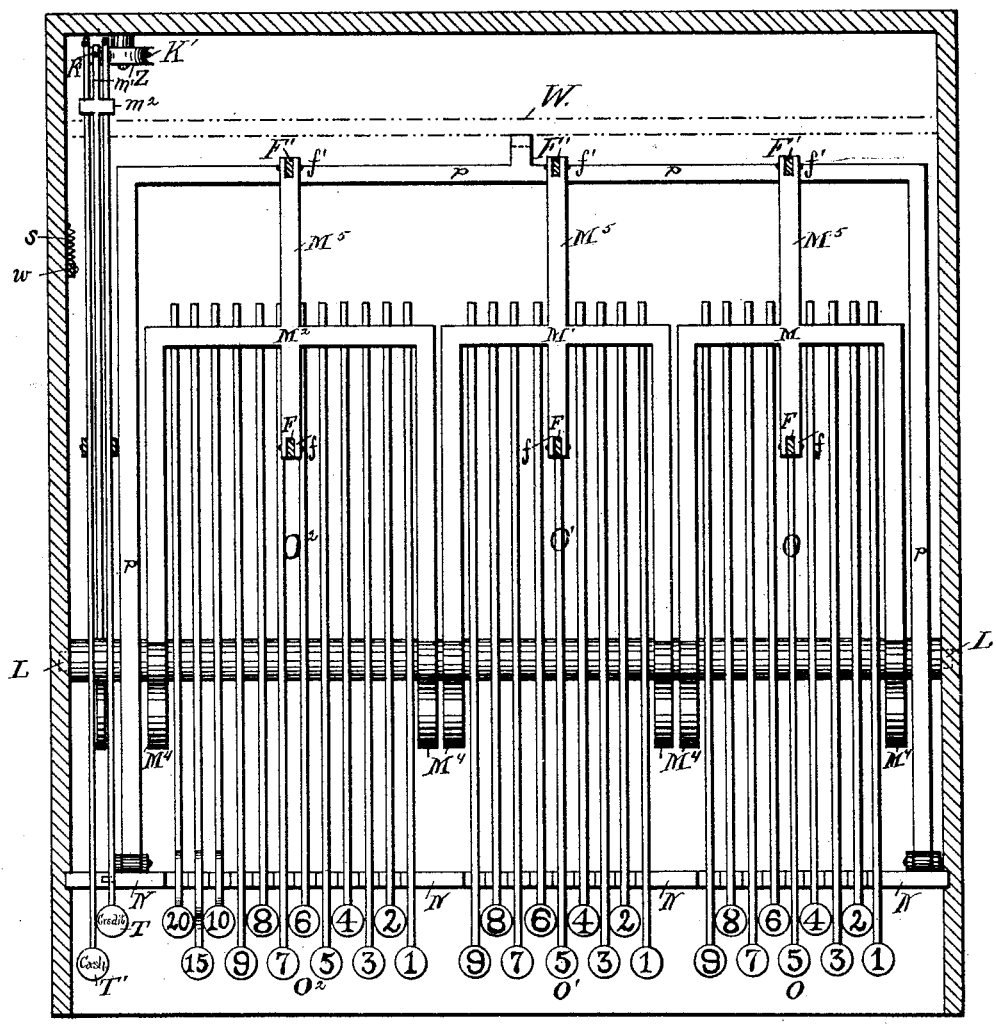
Figure 2:
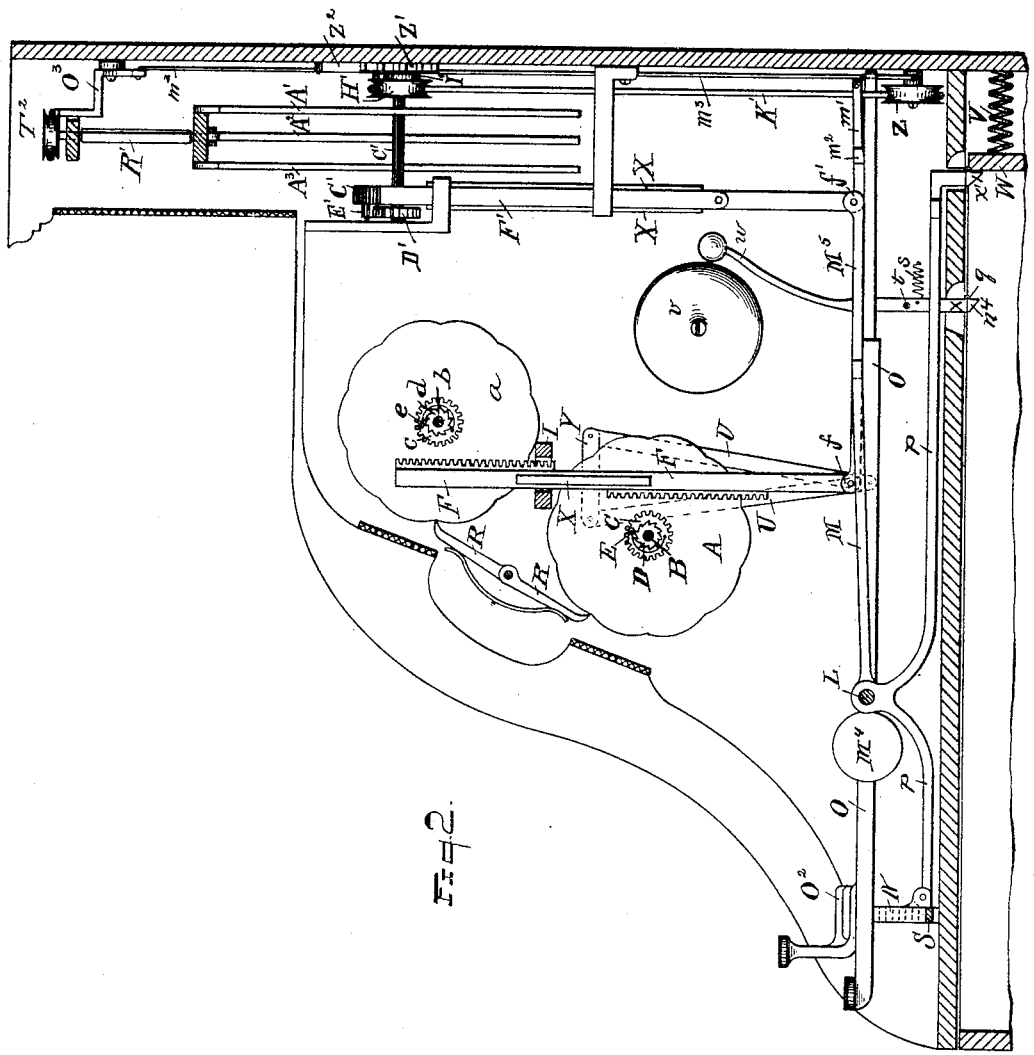
Figure 3:
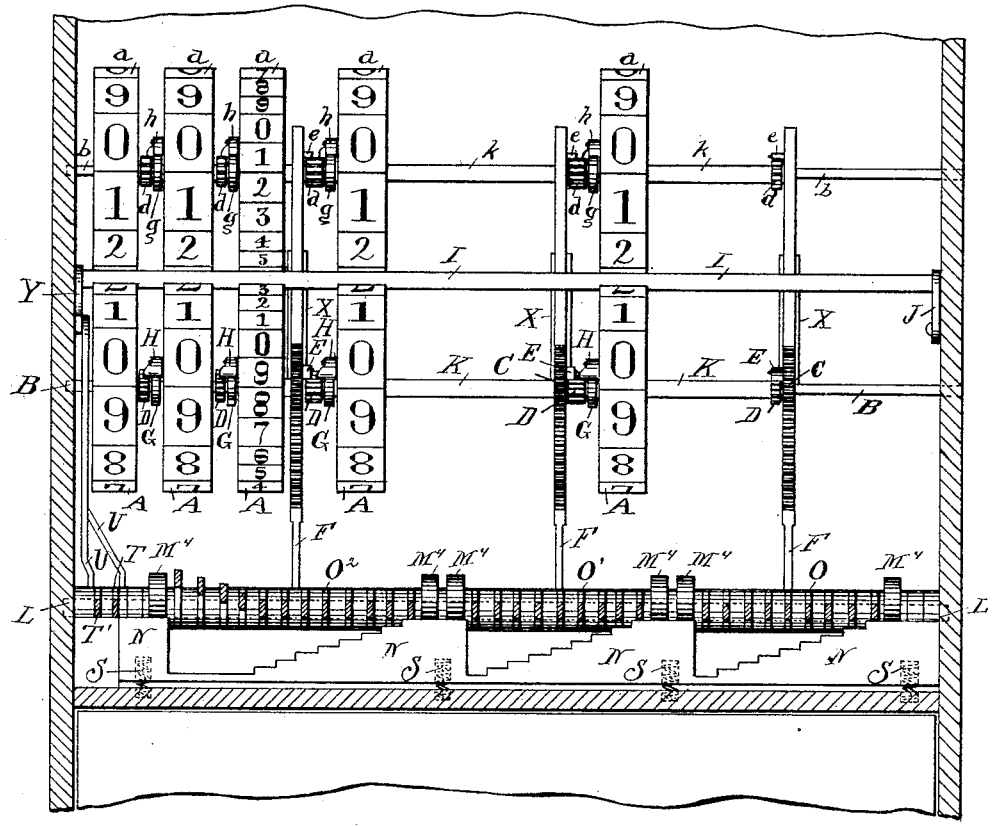
Figure 7:
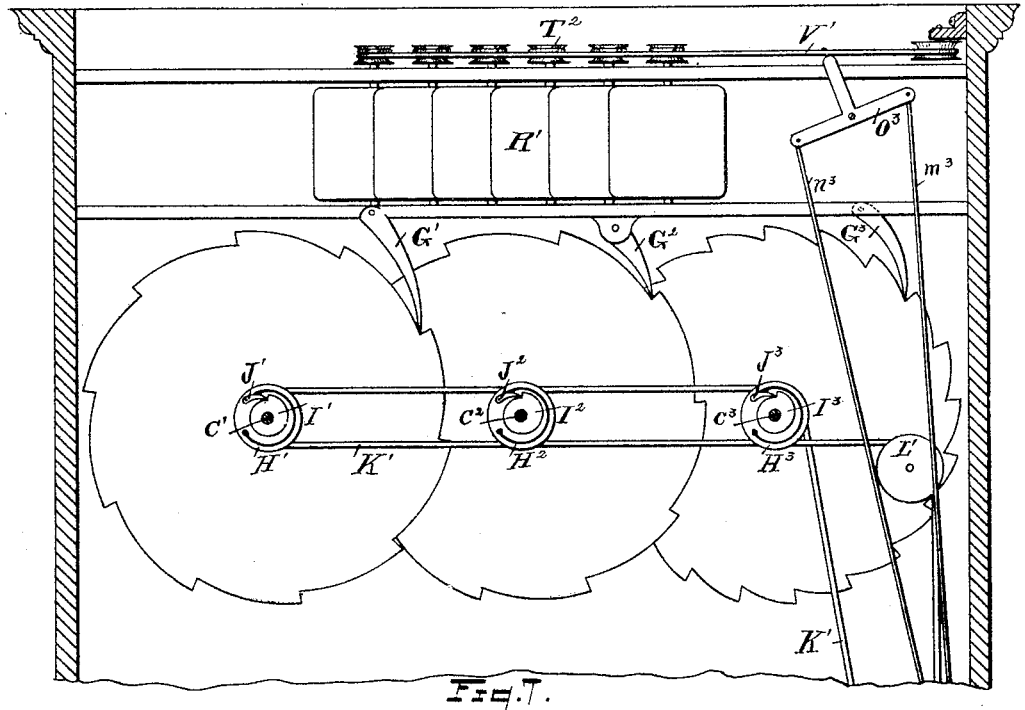
Figure 8:
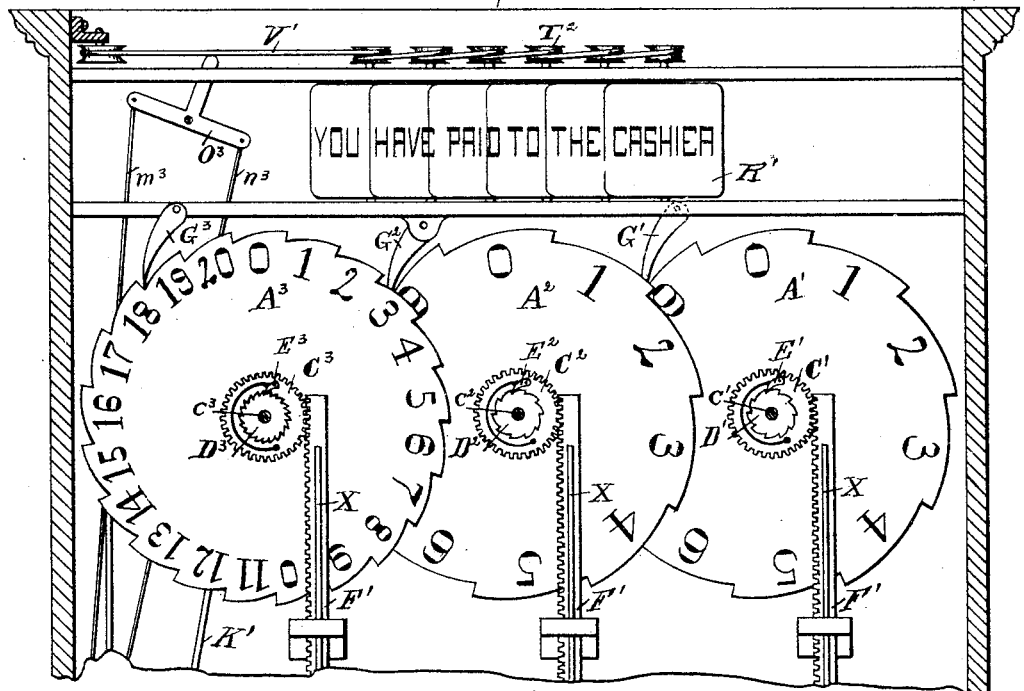

In the annexed drawings, making a part of this specification, Figure 1 is a horizontal section showing the keys by which sales are registered. Fig. 2 is a vertical transverse section. Fig. 3 is a vertical section at right angles thereto, showing parts of the internal works in elevation. Fig. 4 is a perspective view of a bar which shifts the action of the keys from the cash to the credit system of mechanism. Fig. 5 is an elevation of the disk of the registering-wheel and Fig. 6 is a section of the same. Fig. 7 shows in elevation a part of the operative mechanism. Fig. 8 is a similar elevation showing the register-dials. Figs. 9, 10, 11, 12, and 13 represent details of the mechanism.

The same letters are employed in all the figures in the indication of identical parts.

The mechanism is contained in the frame convenienty formed to support it.

O O' O² are a series of levers centrally pivoted upon a shaft L, the front ends of the levers being turned up and marked with figures which, in the case as illustrated, represent different values. Thus the group shown at O in Fig. 1 represents cents. The middle group O' indicates dimes. The group at the left O² represents dollars. Two additional levers T and T' independently placed at the extreme left are respectively marked "Credit" and "Cash." These are the switch-levers and are intended to bring the numbered keys into connection with the credit and cash registering mechanisms, respectively. Each group of keys works in conjunction with its appropriate vibrating frame M M' M². These frames are formed of two side bars and one connecting-bar, and a longitudinal bar M³, which extends horizontally from the middle of the cross-bars. The side bars are pivoted on the rod L. The group of keys O extends under the cross-bar of the frame M; O', under the frame M', and O² under the frame M², so that whenever a cent-key is struck the bar M will be lifted, and so also as to the dimes and dollars. These frames are formed with counter-balances M⁴ on the other side of the rod, so as to make it easy to lift them by the keys. It is necessary that the keys of each group shall swing through an arc of a length differing from any other key of the same group, so that the motion of the key shall be properly registered, and to effect this a bar N is placed under the forward end of the keys, as distinctly shown in Figs. 1, 2, and 3, to act as a stop to their movement, and this bar is cut with steps adapted to each series of keys, so that each key shall have its own special oscillatory movement, as a result of which the free end of the frame M, &c., will be raised to a different height as each number is struck. In the arrangement shown in the drawings, No. 1, group O will slightly raise the free end of frame M. No. 2 will raise it twice as far as No. 1, No. 3 three times as far, and so on to No. 9, which will raise it nine times as far, and so, also, of each of the other groups. The distance through which the keys move need not bear this exact proportion, however.

Upon the frames M, &c., are pivoted to the piece M⁵, at each end at *f f'*, two vertical bars F F'. These bars F are shown in Fig. 2 and are known as the "rack-bars," being furnished with a cog-rack on each face at different elevations corresponding with the position of the two registering-wheels or cash or credit. The upper one of these *a* is the cash-wheel, and the lower one A is the credit-wheel, the rack on each side being opposite the axis of each of these wheels, which are on the opposite sides of the rack-bar. This rack-bar, being pivoted at its lower end, can be shifted from the position shown in Fig. 2, in which it is out of engagement with either wheel, so that the rack on the left-hand side shall engage with the pinion C on the shaft B of the wheel A, or it may be turned to the right, and the rack on the right-hand side will then engage with the pinion *c* on the shaft *b* of the wheel *a*. These pinions C *c* run loosely upon their respective shafts B *b*, but may be made to engage ratchet-wheels D *d* by means of the pawls E *e*, pivoted to the sides of the pinions and engaging at the free ends the notches on the ratchet-wheels, against which they are held in the usual manner by springs. These ratchets are attached to sleeves K, Fig. 6, to which in turn are attached the registering-wheels A. Thus as the downward movement of the forward end of the key raises the frame M, &c., and with it the rack-bar F, a greater or less distance, it follows as a consequence that the wheels A $a$ will be, respectively, moved a greater or less distance, corresponding precisely to the greater or less arc which the end of the key travels, and as different numbers are marked on the registering-wheels it follows that when key No. 1 is struck figure 1 on the registering-wheel will be shown through an opening left in the face of the frame for the purpose, and so with all the other numbers up to 9. As key 9 sweeps through the longest arc it will give to the registering-wheel the greatest amount of movement.

In order that larger amounts may be registered other wheels must be provided to register the number of revolutions of the first wheel, so that when nine cents have been registered and another is to be added the dime-wheel will be thrown forward and the figure 1 thereon will be displayed, and so on in succession until it registers nine dimes, when the next movement will give a forward movement to the dollar-wheel and show one dollar, and so on according to the capacity it is intended to give to the machine to meet the needs of a large or small trade. This is accomplished by means of the following mechanism: H, Figs. 3 and 5, is a pawl attached to wheel A and urged by a spring to engage the ratchet D, the said ratchet-wheel D being fastened rigidly to the sleeve of the wheel A of the next higher denomination, but is held therefrom by a guard-collar G, except at a point in its periphery in which a notch Q is cut, which gives the head of the pawl freedom to enter the notch and engage the ratchet long enough to move it forward the space of one tooth, thus giving motion one step forward to the registering-wheel, and then it is withdrawn from the engagement by the collar G, and so held until another revolution is accomplished and another decimal figure is to be brought forward.

In order that the wheels may not run forward by *vis inertiæ*, a spring-pressed brake R, Fig. 2, presses against the periphery of the wheels, which are formed with scallops corresponding in number and position with the figures on the registering-wheel.

In the case as illustrated, in order to avoid an additional registering-wheel, with its accompanying mechanism, to enable the dollar-indicator to indicate sales up to twenty dollars the dollar-wheel is provided with two notches in its collar G, Fig. 3, so that a half revolution of the wheel may turn the next wheel one space, the said dollar-wheel being divided into twenty peripheral sections and twice numbered from 0 to 9.

The keys T T', Fig. 1, are the switch-keys, by means of which the rack-bars are made to oscillate between the two pinions C $c$. These keys are connected, respectively, to the two ends of the lever Y, Fig. 4, by means of the rods U U. This lever Y is pivoted at Y' to the frame of the machine, and upon it is pivoted a bar I at one end, the other end of said bar being pivoted on the short arm J, which is pivoted to the frame of the machine on the opposite side. Holes $n\ n'\ n^2$ are cut through the bar I in the form of a Greek cross, so as to permit the rack-bars to play freely up and down in their guides, in which they are confined by the wings X, Figs. 2, 3, and 8, on opposite sides of the rack-bar, room being given for the racks to pass through the guide-bar I, the wings X passing through two of the arms of the cross, while the rack-bar passes through the other two arms of the cross in the said guide-bar I.

No additional mechanism is required for resetting the registers to zero, the ends of the shaft being made square to receive a socket-wrench, and the pawls H, Fig. 5, and notch Q being so constructed and arranged in such shape that when the shaft is turned in the same direction as the motion of the wheels, the collars G, which are fast to the shaft, will turn without affecting the wheels until the notch reaches the pawls, when it will catch the pawl and bring the wheel back to zero.

A money-drawer is provided which is clearly shown in Fig. 2, and which is automatically unlocked when the keys are depressed in order to register a sale. This is affected by the following mechanism: The notch-bar N, under the keys, is supported on the frame and held a little above the floor of the machine by means of spring S, Figs. 2 and 3, so that when one key is depressed to its fullest extent it will press N down to the floor. The lever $p$, Fig. 2, is hung on the rod L and attached to one end of the notch-bar N, and the other end is extended and bent at right angles, so as to form a pin or bolt, which, passing down through a hole in the floor, will engage the rear end W of the drawer and prevent its being opened until the depression of the notch-bar N withdraws the pin or bolt and the spring V presses the drawer forward.

The indicating devices consist of three disks A' A² A³, which are operated by means of the rack-bars F', &c., Fig. 8, which are pivoted on the frame M', &c., and engage pinion C' C² C³, similar to the pinion C already described. The pawls E', &c., work into the ratchets D', &c., in a manner already described. The wheels are numbered on their faces, which numbers can be seen through openings only large enough to disclose a single number. After one sale has been made and registered, any further operation of the keys will simply turn the disk still further and add the two amounts together; but in order to indicate a new purchase it will be necessary to start the disks at zero.

As the switch-keys are always depressed before registering a purchase either by cash or credit, they are used for doing the work of resetting, to which end they are provided with the following mechanism: The pulleys H', &c., Figs. 2 and 7, are loose on their respective shafts, and all three of them are connected together by a band or link-belt K'. Another belt or extension of this one passes around an idler L' and thence around the pulley Z, Fig. 2, which is fastened to the back of the machine below the free end of the bar $m'$. This bar $m'$ is fastened at its outer end to the belt or band K'. This bar is engaged by the switch-keys T T' striking the crosspiece $m^2$. (Clearly shown in Fig. 1.) The proportions of these parts are so regulated that the movement of the key can communicate only sufficient movement to the band K' to give one revolution to the pulley H' on the shaft C'. In these revolutions of H' the pawl J' will engage the projection on I' and turn it with the disk on which the numbers are displayed back to zero.

The star-wheel Z', Figs. 2 and 10, is keyed to the shaft C', which carries the indicating-disk, and it is pressed in one direction constantly by the spring $Z^2$ to turn in the direction opposite to that of the normal movement of the disk, but is prevented from so turning by a pawl G', Figs. 7 and 8, which engages the teeth on the periphery of the disk A', &c. This engagement prevents any loose or irregular motion of the disk due to its momentum. Star-wheels are placed on the shaft $C^2$ and $C^3$ in the same manner as the star-wheel Z' is placed on the shaft C'.

In Figs. 7, 8, and 12 a series of tablets (marked R') are pivoted upon vertical axes, and they are so constructed and arranged as that they shall, respectively, overlap the adjusting-tablets to about the middle, so that only half of each tablet is exposed at a time; but by turning the tablet a half-revolution the other half is shown upon the tablets. Thus arranged, words are placed in such manner that when in one position they shall form on both the faces of the tablets one sentence and in another position they shall form another, as shown in Figs. 8 and 13. This half-revolution is accomplished by means of the spools $T^2$, connected by a band or cord V', which is wrapped once around each pulley. The lever $O^3$ is pivoted to the main frame and actuated by rods or cords $m^3$ $n^3$, attached to the ends of the switch-keys T T', so that the movement of the key will swing the lever $O^3$, which carries with it the cord V', and so causes the tablet to turn a half-revolution. The switch-keys T T' are so connected through the lever Y and rods U U' that the movement which depresses one key causes the outer end of the other to be lifted and the inner end thereof to be drawn down. The downward motion will pull downward on the cord $m^3$, as before described, and turn the tablets; but as the amount of motion of the keys is greater than that needed to turn the tablets, instead of attaching the bar $m'$ to the cord $m^3$ rigidly the cords may pass through an opening, so as to allow the key to travel some distance before engaging the cord and provide for this engagement at the proper time to give the cord $m^3$ that amount of movement which is necessary to cause the wheel H' to complete one revolution.

A bell may be attached to the drawer to sound an alarm whenever the drawer is opened. The mechanism for this is shown in Fig. 2. $w$ is a rod carrying a hammer pivoted at $t$ and acting against the bell $v$. It extends below the pivot and passes through a hole in the floor, extending into the drawer a little distance, so that when the drawer is drawn out the end $x$ of the rod will be carried by the end W of the drawer and the hammer be drawn away from the bell until the end of the drawer has passed beyond the end of the rod, when the latter will be free and the hammer will be drawn against the bell by the contraction of the spiral spring $s$. A triangular piece $n^4$ is hinged to the lower end of the rod $w$ at $q$, so that when the drawer is pushed in the back end of the drawer, striking against the hinged piece $n^4$, will turn it up out of the way, and thus allow the end of the drawer to pass without affecting the bell. A triangular piece $x'$ is similarly hinged to the bolt, which locks the drawer and permits the back of the drawer to pass without affecting the other parts of the mechanism.

What I claim as my invention, and desire to secure by Letters Patent, is—

1. The combination of a series of groups of keys O O' $O^2$ and the respective swinging frames M M' $M^2$, independently connected therewith, and a notched bar N, which defines the movement of each key of the respective groups, and a series of rack-bars F F', and the two series of wheels A $a$ A' $A^2$, independently actuated to receive a rotative motion proportioned to the extent of the movement of the respective keys of the different groups, substantially as set forth.

2. In combination with the keys O, swinging frame M, and rack-bar F, having cogs on both front and rear faces, the cash and credit wheels, and mechanism for turning said wheels, respectively, and for shifting the rack-bar from one to the other, substantially as set forth.

3. In combination with the keys O, swinging frame M, wheels A, pinion C, ratchet D, and pawl E, a rack-bar F, adapted to be thrown into and out of engagement with the pinion at will, whereby the finger-keys are caused to actuate the wheels A or to leave them unacted upon when the keys are depressed.

4. In combination with the keys O, swinging frame M, adjustable rack-bar with cogs on opposite faces acting upon the wheels A $a$, the rods U, levers Y Y', and rocking bar I for shifting the rack-bar, substantially as set forth.

5. In combination with the keys O, swinging frame M, adjustable rack-bar F, and wheels A $a$, the brake R, engaging scallops on the edges of the wheels, substantially as set forth.

6. In combination with the cash and credit registers, the keys O, swinging frame M, and adjustable rack-bar F, and rods U, by means of which said rack-bar may be shifted, the switch-keys T T', to which said rods are connected, whereby the keys O may be connected with either the cash or credit register, substantially as set forth.

7. The combination of the loose pulley H', the band K', pulley Z, the bar $m'$, the keys T T', cross-piece $m^2$, and pawls J', and wheel I', substantially as set forth.

8. In combination with the reversible tablets R', overlapping one another, the spools T$^2$, and band V', the lever O', cords $n^3$ $m^3$, and switch-keys T T', substantially as set forth.

9. The combination of the switch-keys T T', lever Y, and rods U U, and cords $m^3$ $n^3$, so arranged that the movement which raises the inner end of one switch-key shall correspondingly depress the other and pull downward upon the cords $m^3$ $n^3$, substantially as set forth.

10. In combination with the indicator-wheel and shaft C', the pulley H', pawl J', wheel I', and belt K' for turning the numbered disk back to zero, substantially as set forth.

11. In combination with the tablets R', turning upon spindles to expose their opposite faces, the pulleys T$^2$, belt V', lever O$^3$, and cords $m^3$ $n^3$, and keys T T', substantially as set forth.

In testimony whereof I have hereunto set my hand in the presence of two attesting witnesses.

HENRY C. STILWELL.

Witnesses:
 L. S. McKIBBEN,
 GEORGE F. McKIBBEN.